United States Patent [19]
Yasui

[11] Patent Number: 5,388,457
[45] Date of Patent: Feb. 14, 1995

[54] THERMAL FLOW SENSOR

[75] Inventor: Katsuaki Yasui, Hyogo, Japan

[73] Assignee: Mitsubishi Denki Kabushiki Kaisha, Tokyo, Japan

[21] Appl. No.: 10,179

[22] Filed: Jan. 28, 1993

[30] Foreign Application Priority Data

Feb. 4, 1992 [JP] Japan .................. 4-018738

[51] Int. Cl.$^6$ ............................................. G01F 1/68
[52] U.S. Cl. ................................................ 73/204.26
[58] Field of Search ............ 73/204.25, 204.26, 204.27

[56] References Cited

U.S. PATENT DOCUMENTS

| | | | |
|---|---|---|---|
| 2,870,305 | 1/1959 | Ling . | |
| 3,498,127 | 3/1970 | Richards | 73/204.26 |
| 3,592,055 | 7/1971 | Dorman | 73/204.24 |
| 3,900,819 | 8/1975 | Djorup | 73/204.26 |
| 3,938,384 | 2/1976 | Blair | 73/204.27 |
| 4,345,465 | 8/1982 | Gruner et al. | 73/204.26 |
| 4,498,337 | 2/1985 | Gruner . | |
| 4,554,829 | 11/1985 | Sumal | 73/204.26 |
| 4,594,889 | 6/1986 | McCarthy | 73/204.26 |
| 4,881,407 | 11/1989 | Tashahashi | 73/204.25 |
| 5,060,511 | 10/1991 | Sakaue | 73/204.26 |
| 5,094,105 | 3/1992 | Emmert, Jr. et al. | 73/204.25 |

*Primary Examiner*—Herbert Goldstein
*Attorney, Agent, or Firm*—Sughrue, Mion, Zinn, Macpeak & Seas

[57] ABSTRACT

A thermal flow sensor according to the present invention is provided with a flow velocity probe equipped with a support member formed with an insulating wire material and a heat-sensitive resistor attached on a surface of the support member, in which the heat-sensitive resistor is formed as a film and made of a material whose resistance varies with temperature.

8 Claims, 2 Drawing Sheets

THERMAL FLOW SENSOR

BACKGROUND OF THE INVENTION

The present invention relates to a thermal flow sensor for measuring a flow and a flow velocity of fluid.

FIG. 3 is a diagram showing a construction of a conventional thermal flow sensor, for instance, disclosed by Unexamined Japanese Utility Model Application (OPI) No. Sho. 61-108930. A detecting tube 202 is provided at a predetermined position inside a housing 201 along a main flow passage of the fluid.

A flow velocity probe 203 provided with a heat-sensitive resistor 306 (as shown in FIG. 4) and a fluid temperature sensor 204 are disposed at a predetermined position inside the detecting tube 202. These two components form a bridge circuit with resistances $R_1$ and $R_2$. Nodes b and c of the bridge circuit connect to input terminals of a differential amplifier 101. An output of the differential amplifier 101 is connected to a base of a transistor 102, while an emitter of the transistor 102 is connected to an end a of the bridge circuit, and a collector of which is connected to a power source 103.

FIG. 4 is a plan view showing a flow velocity probe 203 of another conventional thermal flow sensor disclosed by Unexamined Japanese Patent Application (OPI) No. Hei. 2-269915, and FIG. 5 is a side view of the flow velocity probe 203. As shown in FIGS. 4 and 5, an insulation substrate 305 is provided, and a heat-sensitive resistor 306 is attached on the substrate 305, which is formed as a film and made of a material whose resistance varies with temperature. A patterning line 307 is drawn on the heat-sensitive resistor 306 for forming a current passage. Both lead wires 308 are connected to both ends of the heat-sensitive resistor 306.

FIG. 6 is a perspective view showing a detecting tube 402 and a flow velocity probe 403 of still other conventional thermal flow sensor so called as a heating wire type, disclosed by Unexamined Japanese Patent Application (OPI) No. Sho. 55-6294. The flow velocity probe 403 of this type does not have a support member. The flow velocity probe 403 is formed with only a wire material made of a heat-sensitive resistance material such as platinum wire in this prior art.

An operation of the conventional thermal flow sensor will be described as follows. When the fluid of a constant flow flows inside the housing 201, a current supplied to the bridge circuit is controlled by a control circuit constituted by the differential amplifier 101 and the transistor 102 in order that the temperature of the heat-sensitive resistor 306 provided in the flow velocity probe 203 may be higher than the temperature of the fluid by a predetermined temperature. Therefore, the bridge circuit is in a balanced state.

In this state, when the flow of the fluid increases, the resistance value of the heat-sensitive resistor 306 is changed by being cooled, so that the bridge circuit becomes in an imbalanced state, and then the current supplied to the bridge circuit is increased. Therefore, an average temperature of the heat-sensitive resistor 306 returns to the original temperature by heating. As a result, the balanced state of the bridge circuit is recovered.

During the above operation, the heat generated on the heat-sensitive resistor 306 is consumed for heating peripheral portions of the flow velocity probe 203 through the substrate 305 as well as heating the heat-sensitive resistor 306 itself. Since a ratio of the heat consumed for both purposes varies in accordance with the flow, a temperature distribution of the peripheral portions is also changed by the flow.

Although the average temperature is controlled in the balanced state, in the case where the flow of the fluid is rapidly changed, the control circuit acts transitively until the temperature of each of the peripheral portions reaches a temperature corresponding to the flow velocity, because the temperature of each of the peripheral portions varies in accordance with the flow velocity. Therefore, a correct output cannot be obtained from the control circuit during the transitive period.

An operation of still other conventional thermal flow sensor of the heating wire type is similar to that of the conventional thermal flow sensor described above. However, comparing the conventional thermal flow sensor with the sensor of the heating wire type, since the heating wire type flow sensor allows the flow velocity probe to be formed thinner, a conduction coefficient of the compulsive convection heat is improved. Further, the heat conductivity in the flow velocity probe is small and, accordingly, heat transmitted to the peripheral portions is also small.

However, since the flow velocity probe of the conventional thermal flow sensor is constituted as described above, a relatively long time is required until the temperature distributions of the flow velocity probe and peripheral portions of the flow velocity probe become in a balanced state when the flow of the fluid is rapidly changed. Therefore, there is a problem in terms of the responsiveness as a flow sensor. There is another problem in that unevenness of the heat capacity transmission from the substrate to the peripheral portions affects the characteristics of the flow velocity probe.

Moreover, with respect to still other conventional thermal flow sensors of the heating wire type, since an aspect ratio of the flow velocity probe is large, it is able to prevent the heat from transmitting from the flow velocity probe to the peripheral portions. However, a sufficient sectional area is required to obtain the necessary strength and to improve the durability of the flow sensor, and the length of the flow velocity probe is required to be longer. Therefore, there is another problem in that power consumption of the flow velocity probe undesirably increases.

SUMMARY OF THE INVENTION

With the above problems and degree of responsiveness accompanying the conventional thermal flow sensor in view, an object of the present invention is to provide a thermal flow sensor which has a high responsibility, stable characteristics, and a small power consumption power.

A thermal flow sensor according to the present invention is provided with a flow velocity probe equipped with a support member formed with an insulating wire material and a heat-sensitive resistor attached on a surface of the support material, in which the heat-sensitive resistor is formed as a film and made of a material whose resistance varies with temperature.

Since the support member of the flow velocity probe, according to the present invention, is formed of a wire-shaped insulating material, the thermal flow sensor prevents heat from transmitting from the flow velocity probe to other portions, and has a high degree of responsiveness required as a practical flow sensor. Further, unevenness of characteristics can be suppressed, and the thermal flow sensor, according to the present invention, having substantially the same strength and durability as the conventional sensor, causes a higher resistance value per unit length than the conventional sensor. In other words, the sensor of the claimed invention can be assembled so that the flow velocity probe is short in length to thereby decrease power consumption.

BRIEF DESCRIPTION OF THE DRAWINGS

In the accompanying drawings.

DESCRIPTION OF THE PREFERRED EMBODIMENTS

A preferred embodiment of a thermal flow sensor according to the present invention will now be described in detail with reference to accompanying drawings.

Figure 1:
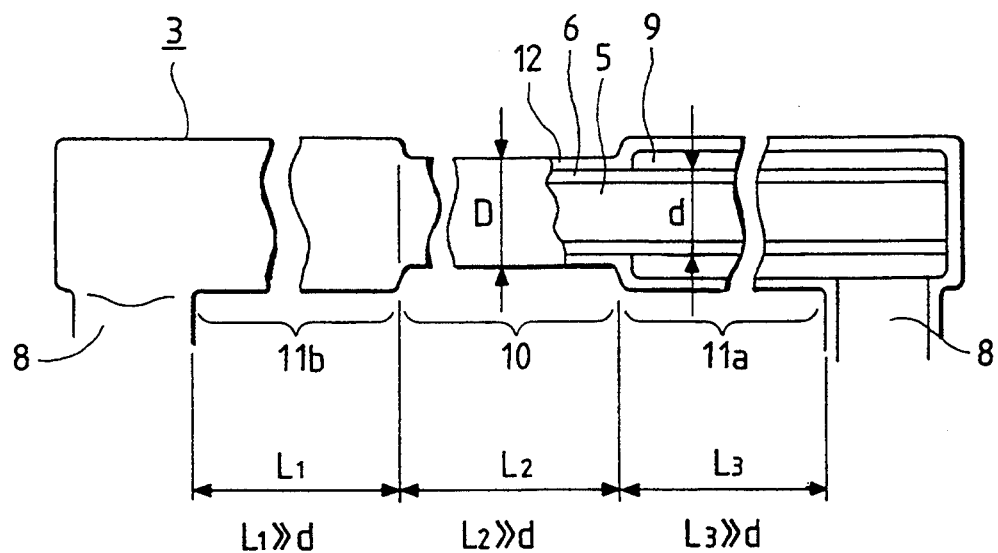
FIG. 1 is a partially broken plan view showing a flow velocity probe of a thermal flow sensor according to a first embodiment of the present invention.

FIG. 1 is a partially broken plan view showing a flow velocity probe of a thermal flow sensor according to a first embodiment of the present invention. A flow velocity probe 3 is wholly shown in FIG. 1. A support member 5 is formed with a wire material acting as an electrically insulating material such as a glass fiber, for example, for the purpose of achieving an aspect ratio greater than 20. A heat-sensitive resistor 6 is attached on the support member 5, and is formed as a film and made of a material whose resistance varies with temperature.

Lead wires 8 are connected to both ends of the heat-sensitive resistor 6. Both conductors 9 are formed with conductive film materials. Both the conductors 9 are attached over their length and are more than five times as long as a thickness d of the support member 5 from both ends of the flow velocity probe 3. The heat-sensitive resistor 6 substantially operates on a heat-sensitive portion 10. Heat insulating portions 11a and 11b are provided at both ends of the flow velocity probe 3. The conductors 9 decrease wire-resistance values of the heat-sensitive resistor 6 thereby suppressing the generation of heat from the resistor 6 at the heat insulating portions 11a and 11b. A protection coat 12 is coated over the whole of the flow velocity probe 3. Dimension D is a diameter including the support member 5, the heat-sensitive resistor 6 and the protection coat 12. Letting each length of the heat insulating portion 11a, the heat insulating portion 11b, and the heat-sensitive portion to be $L_3$, $L_1$, and $L_2$, respectively, the relations of $L_1 > d$, $L_2 > d$, and $L_3 > d$ are provided.

Operation of the thermal flow sensor will be described as follows. The basic operation of the thermal flow sensor, according to the present invention, is similar to that of a conventional sensor. However, since the flow velocity probe 3 of the thermal flow sensor according to the present invention has the large aspect ratio thereof, and further provides the heat insulating portions 11a, 11b between the heat-sensitive portion 10 and the leading wire 8, the heat transmitting from the flow velocity probe 3 to other portions is extremely small. Therefore, even if the flow of the fluid increases rapidly, and then the current supplied to the bridge circuit is increased, the temperature distribution of the heat-sensitive resistor 6 is hardly affected by a large change generated. As a result, the temperature distribution rapidly achieves the balanced state, and the responsiveness required of the flow sensor is improved since unevenness of characteristics of the flow sensor are not generated. When the thermal flow sensor according to the present invention has substantially the same strength and durability as the conventional sensor, the thermal flow sensor can have a higher resistance value per unit length than the conventional sensor. In other words, the sensor of the invention can be assembled so that the flow velocity probe 3 is short in length to thereby decrease power consumption.

Figure 2:
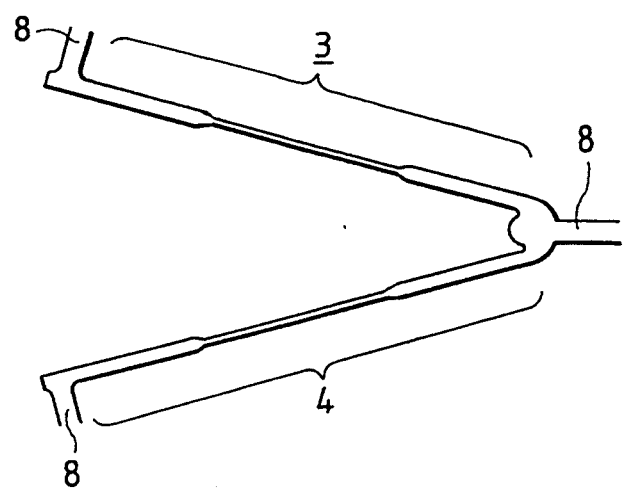
FIG. 2 is a perspective view showing a flow velocity probe unitary with a fluid temperature sensor of a thermal flow sensor according to a second embodiment of the present invention.
Figure 3:
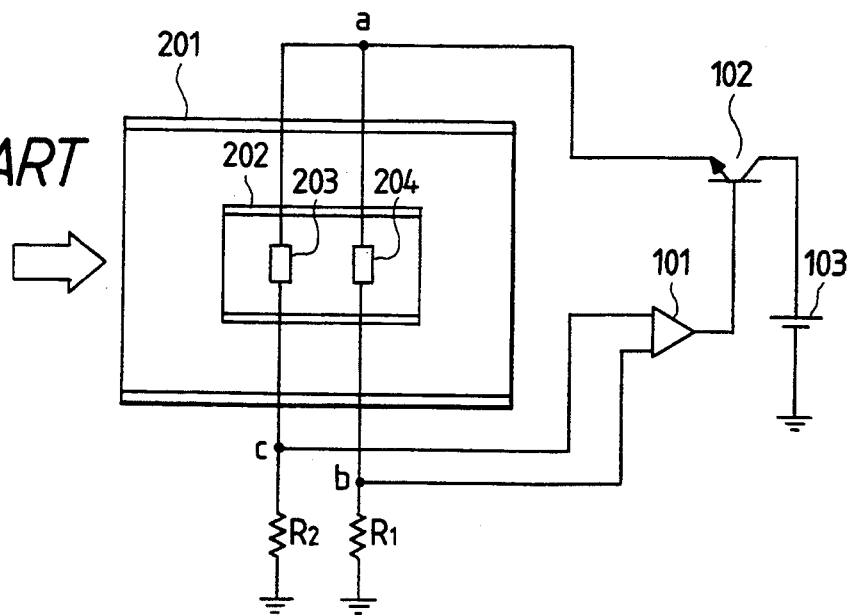
FIG. 3 is a diagram showing a construction of a conventional thermal flow sensor.
Figure 4:
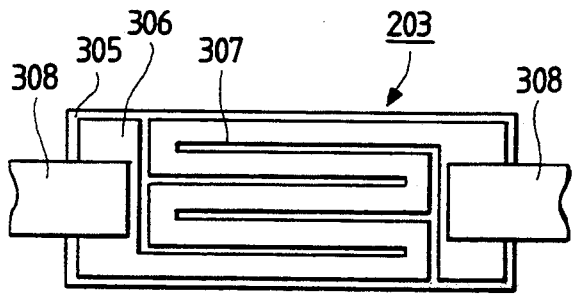
FIG. 4 is a plan view showing a flow velocity probe of another conventional thermal flow sensor.
Figure 6:
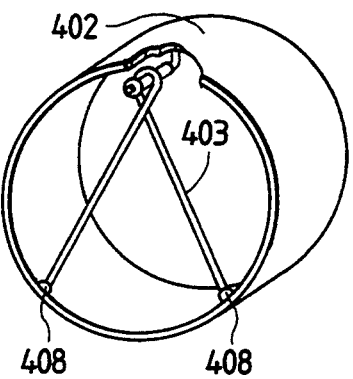
FIG. 6 is a perspective view showing a detecting tube and a flow velocity probe of still other conventional thermal flow sensor.
Figure 5:
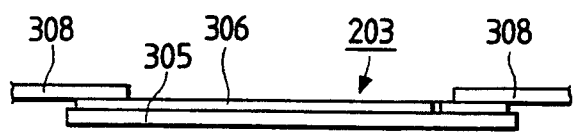
FIG. 5 is a side view showing the flow velocity probe of another conventional thermal flow sensor.

With the above embodiment, the flow velocity probe 3 is described in detail. However, since fundamental mechanism is entirely the same as between the flow velocity probe 203 and the fluid temperature sensor 204 as shown in FIG. 3, the flow velocity probe 3 may be employed as a fluid temperature sensor. Particularly, since the heat-sensitive portion 10, according to the present invention, has a high heat-insulation against the other portions, it can effectively measure only a temperature of a measured fluid when there is a difference in temperature between the housing and the measured fluid. Moreover, since the flow velocity probe 203 electrically connects the fluid temperature sensor 204 as shown in FIG. 3, these two components may be unitedly formed as shown in FIG. 2 to thereby decrease production cost.

As described above, according to the present invention, the thermal flow sensor is provided with the flow velocity probe equipped of a wire-shaped support member formed with the insulating material and the heat-sensitive resistor attached on a surface of the support member, in which the heat-sensitive resistor is formed as a film and made of a material whose resistance varies with temperature. Therefore, the thermal flow sensor prevents the heat from transmitting from the flow velocity probe 3 to the other portions. The thermal flow sensor has a high degree of responsiveness, stable characteristics, and small unevenness.

Moreover, when the thermal flow sensor, according to the present invention, has substantially the same strength and durability as the conventional sensor, the thermal flow sensor can cause a higher resistance value per unit length than the conventional sensor. In other words, the sensor of the invention can be assembled so that the flow velocity probe is short in length to thereby decrease power consumption.

What is claimed is:

1. A thermal flow sensor, comprising:
    means for detecting a flow and a flow velocity of fluid, said detecting means comprising:
    a support member disposed inside a flow passage or a detecting tube, said support member being formed with a wire-shaped electrically-insulating material;
    a heat-sensitive resistance member attached on a surface of said support member, wherein said heat-sensitive resistance member is an uncut film made of a material whose resistance varies with temperature; and conductive film member formed at an end of said detecting means and attached to a surface of said heat-sensitive resistance member, and having a length along said surface more than five times as long as a thickness of said support member.

2. The thermal flow sensor of claim 1, wherein said support member has a large aspect ratio a value of which is more than 20.

3. The thermal flow sensor of claim 1, wherein said support member is formed with a wire-shaped electrically-insulating material comprised of two of said heat-sensitive resistance members, one said heat-sensitive resistance member is employed as a flow velocity probe, the other is employed as a fluid temperature sensor.

4. The thermal flow sensor of claim 3, wherein said flow velocity probe and said fluid temperature sensor are unitedly formed.

5. The thermal flow sensor of claim 1, wherein said support member is formed with a glass fiber.

6. The thermal flow sensor of claim 1, wherein a protection coat is coated over the whole of said detecting means.

7. The thermal flow sensor of claim 1, wherein said detecting means comprises a flow velocity probe.

8. The thermal flow sensor of claim 1, wherein two of said film conductive members are attached on a surface of said heat-sensitive resistance member.

* * * * *